FIG. 1.

INVENTOR.
RUDOLPH BIRMANN
BY
ATTORNEYS

INVENTOR.
RUDOLPH BIRMANN
BY
ATTORNEYS

March 5, 1957 R. BIRMANN 2,783,965
TURBINES

Filed Feb. 1, 1949 6 Sheets-Sheet 4

INVENTOR.
RUDOLPH BIRMANN
BY
ATTORNEYS

March 5, 1957 R. BIRMANN 2,783,965
TURBINES
Filed Feb. 1, 1949 6 Sheets-Sheet 6

INVENTOR.
RUDOLPH BIRMANN
BY
ATTORNEYS.

United States Patent Office 2,783,965
Patented Mar. 5, 1957

2,783,965

TURBINES

Rudolph Birmann, Newtown, Pa.

Application February 1, 1949, Serial No. 73,977

23 Claims. (Cl. 253—39.15)

This invention relates to turbines and particularly to gas turbines adapted to operate at high temperatures and high peripheral speeds.

As is known in this art, gas turbines for maximum efficiency should operate at very high temperatures and high rotational speeds, conditions which impose extreme requirements on the turbine blading which much be cooled to such extent as not to fail under the conditions of high peripheral velocity. Many proposals have been made to effect cooling but these have always involved one or more of the disadvantages of excessive power consumption directly chargeable to the cooling process, reduction in turbine efficiency due to the cooling provisions, reduction in available energy of the working gases due to their being mingled with cooling air or their being unduly chilled otherwise by the blade-cooling means, mechanical constructions involving excessive complications which affect the life and reliability of the turbine, or complicated means for utilizing and/or disposing of the heat absorbed by cooling.

One object of the present invention is the provision of a novel arrangement for the cooling of gas turbine blading making possible operation at initial temperatures of 2000° F., or higher, of the working gases.

In accordance with the invention a turbine is provided capable of handling efficiently an unusually high pressure drop in the first stage. This high pressure drop brings about a correspondingly high temperature drop and in combination with a rather low relative velocity in the blading results in a low average temperature of the relative flow through the blading.

Owing to the high pressure ratio and the large absolute velocity resulting therefrom the blades of the high pressure turbine stage are short and are characterized by possessing a much larger taper ratio (i. e., the ratio of the blade section area at the base to that at the tip) than can be obtained in conventional turbine blading, without seriously impairing efficiency and flow characteristics. This large taper ratio, in addition to having a beneficial effect on the blade stresses, makes possible a large heat withdrawal from the blades at their base portions.

In accordance with the invention advantage is taken of the possibility of intensive heat flow to the base in accordance with the above, and special large heat transfer areas, the combined surface of which is of the order of five times the total blade surface, are provided immediately inside the blade base diameter. These heat transfer surfaces, constituting a highly efficient rotating heat exchanger, may be made from a ferritic metal having more than twice the heat conductivity of the austenitic blade material. The cooling medium employed in this rotating heat exchanger is compressed air which is provided by a compressor built as a part of the turbine rotor and capable of producing a pressure ratio of the order of 2. This air, after compression, is heated by flowing through the rotating heat exchanger and is then expanded through nozzles to act on a special highly efficient set of turbine blades also integral with the turbine rotor. The cooling cycle accordingly consists of compression, heating and expansion, the pressure and temperature relationships, losses, etc., in this cooling cycle being such that under most conditions of operation a slight positive power output is obtained which means that the heat absorbed by cooling is not wasted but is transformed into useful work.

In accordance with one version of the invention the heat exchanger above referred to comprises fins extending in axial planes and heat is transferred solely from the bases of the blades to these fins. In accordance with another version of the invention the compressed cooling air may not only cool fins of this same general nature but may be deflected through the hollow interiors of the various blades. The relatively slender shapes of the airfoil type blades which are used are ideal for internal cooling because they do not require such elaborate internal baffling as is necessary for the conventional blades of thick sections which have been generally heretofore used to define gas channels.

In addition to cooling by conduction through the bases of the blades as described above, the blades are further effectively cooled by radiation. This is accomplished by surrounding the blades with relatively cold surfaces to which their heat can radiate and by the configuration of the blades themselves, particularly involving their wide spacing and location in suitable positions relative to the cold surfaces. The cold surfaces are provided not only by the rotor which is intensively cooled by the heat exchange system heretofore indicated but by the turbine casing which is externally provided with closely spaced copper or silver fins in heat exchange relationship with which there flows compressed air on its way to the combustion chambers, this air flowing in multipass-fashion between these fins so as to be preheated while at the same time effecting cooling of the turbine casing for the purpose of cooling the blades by radiation.

The temperatures to which blades can be cooled below the total temperature of the relative flow (i. e. the stream temperature plus the equivalent of the kinetic energy of the stream) depends on the balance between heat input from the driving gas stream and the heat withdrawal which is accomplished by cooling in the aforementioned manners. It will be evident that the temperature of the blades can be reduced if, for a fixed intensity of cooling, the heat input to the blades can be reduced. The heat transfer from a gas stream to blades therein is roughly proportional to the frictional losses of the stream. In accordance with the present invention blading is provided involving substantially lower friction losses, due to an improved degree of approach to laminar flow adjacent to the blades, than those occurring in conventional blades and, accordingly, the rate of heat transfer to the blades is reduced.

The attainment of the last mentioned condition is consistent with other conditions. Turbines provided in accordance with the invention are designed to operate at substantially higher tip speeds than those ordinarily obtainable. To secure this end the blading must be considerably lighter than conventional blading. The blades must also be capable of effecting an extraordinarily large turning angle of the relative flow with very high efficiency to achieve the transformation of a large enthalpy drop into mechanical energy. These and other requirements are achieved by the design which will be hereafter described involving attainment of the turning action normally achieved by a single row of turbine blades by means of successive partial turnings by cascades of thin airfoils. Compared with conventional turbine buckets these airfoil blades are only lightly loaded, and owing to the relatively small turning angle which each blade is called upon to impart to the gas stream, excessive thickening of the boundary layers with accompanying high friction losses is avoided. The individual blade rows are narrow in the direction of flow, and before any boundary layer may be built up to substantial thickness it is shed in the trailing wake of one row of blades so as to be dissipated. Additionally, the rows of blades are so located in relation to each other that a boundary layer energizing effect is secured in accordance with the slotted-wing principle conventionally employed in aircraft.

In spite of their relatively light aerodynamic loading the blades may have the low solidity, i. e., wide spacing, and low height necessary for the radiation cooling mentioned above which, in combination with the fact that they have preferably very thin, slender profiles as contrasted with the heavy-bodied sections of conventional blading, makes them extremely light and permits the attainment of extraordinarily high peripheral speeds while maintaining conservative stresses. The blades may be low in height because, being capable of operating at extremely high tip speeds with high enthalpy drops, there may be very high absolute velocities ahead of the blades. Their low height greatly increases the effectiveness of cooling. In conventional blades of high turning angle, the flow area is greatly reduced by the thickness of the blades at their central portions, this being avoided in the present design making low height possible.

The cascade arrangement of blades provides turning of the relative flow over a total angle necessary to obtain the required conversion of kinetic energy into shaft horsepower with a substantially higher efficiency than is possible with the conventional turbine blades effecting a large angle of turn in a single blade row, so that in addition to the advantages of low blade weight and highly effective cooling the design of blading in accordance with the invention involves unusually high efficiency.

In accordance with the invention, the multicascade airfoil blading is supported by a rotor, of the type described in detail in my application Serial Number 428,627, filed May 10, 1954 (which application is in part a continuation of my application, Serial No. 38,995, now abandoned) formed as a shell subject substantially only to tension stresses. As pointed out therein this type of rotor construction makes possible a very light rotor of maximum strength and capable of operating at high temperatures.

This form of rotor is consistent with requirements of continuity to the effect that there must be a substantial change in blade height with progression along the axis of rotation. A three dimensional flow path is thus imposed and accordingly the blades are designed in accordance with the principles detailed in said prior application to provide proper efficient flow to effect the transformation from kinetic to mechanical energy with high efficiency and with proper blade loading.

In accordance with the invention various improved mechanical features are provided particularly concerned with the assembly of the various rotating parts to secure maximum strength and heat transfer with the elimination of weight which has characterized in particular the fastening of turbine blades to rotors in the prior art. The resulting minimizing of weight contributes greatly to making possible the desired high peripheral speeds.

The objects of the invention may be generally stated as involving the securing of the various advantageous results indicated in the foregoing discussion. As will be evident, various of these objects may be attained without the others though, as will become apparent hereafter, it is desirable to combine the various features which are consistent with each other and lead in combination to the attainment of the most desirable results.

These and other objects of the invention particularly relating to details of construction and operation will become apparent from the following description read in conjunction with the accompanying drawings in which.

Figure 1:
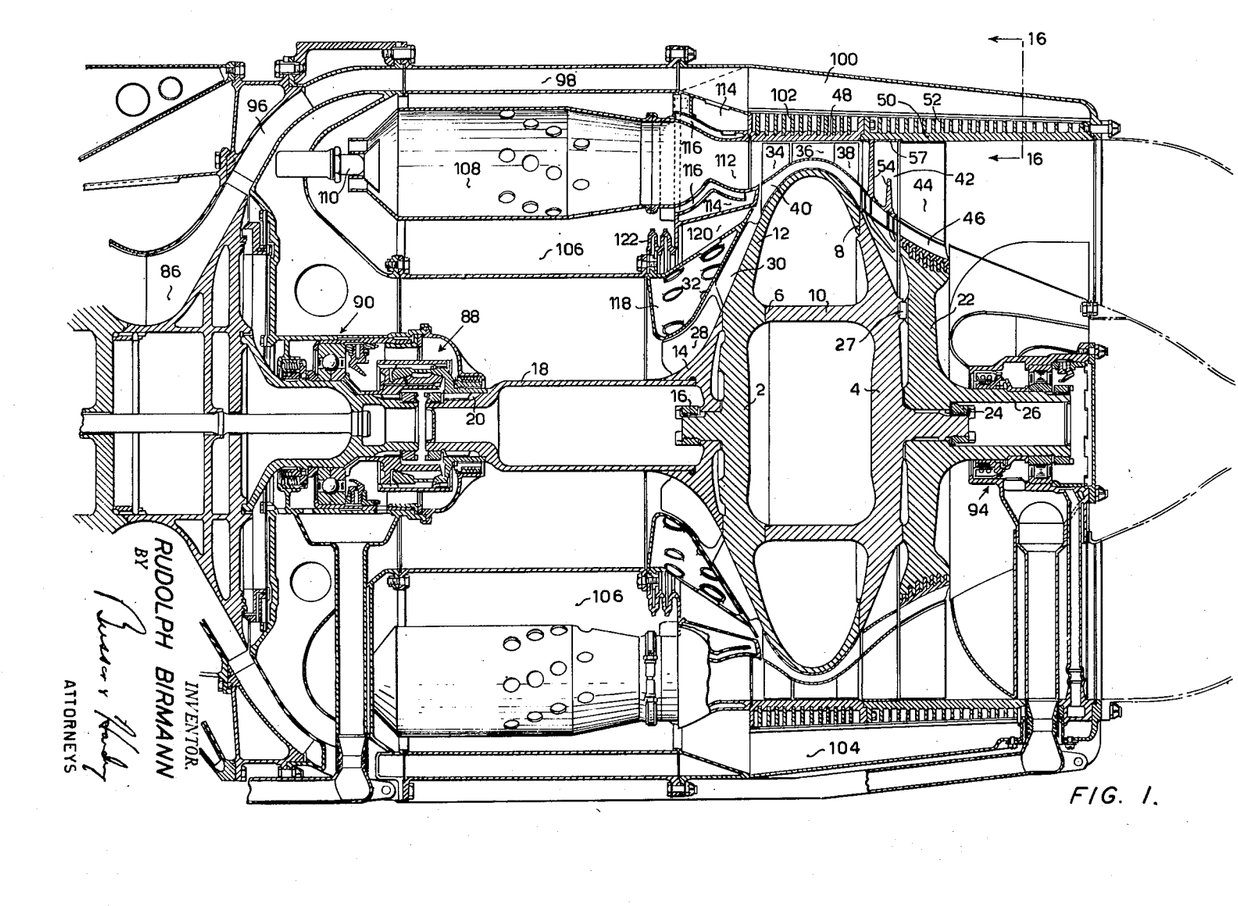
Figure 1 is an axial section taken through the turbine portion of a gas turbine power plant showing in association with the turbine the last stage of an air compressor, the combustion chambers, provisions for cooling, and other associated parts.
Figure 2:
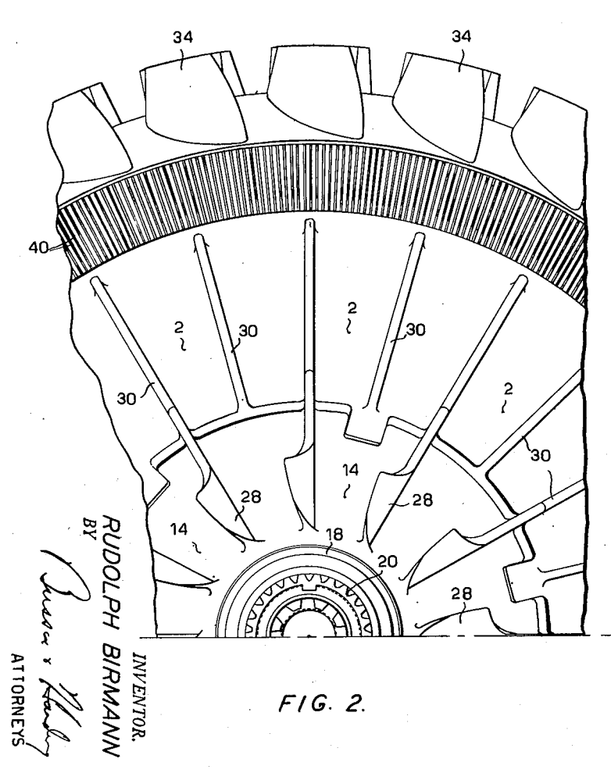
Figure 2 is a fragmentary elevation of the turbine rotor of Figure 1 viewed from the left thereof.
Figure 3:
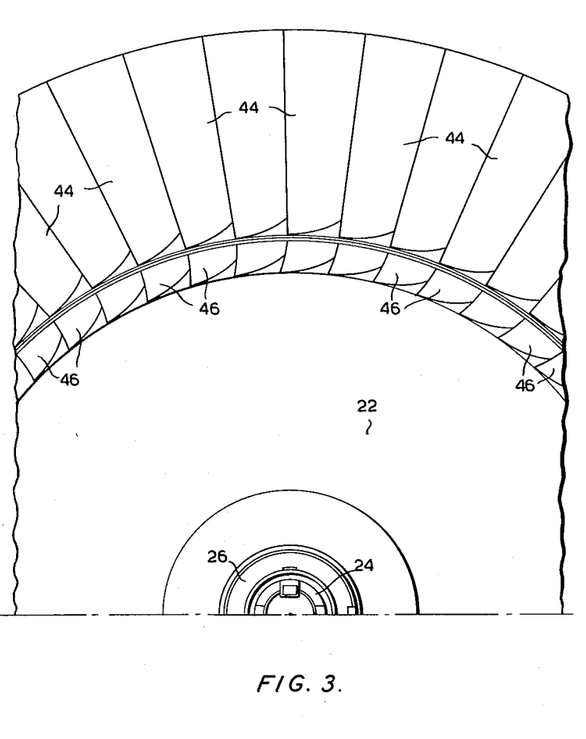
Figure 3 is a fragmentary elevation of the turbine rotor of Figure 1 viewed from the right thereof.

The first stage rotor of the turbine illustrated in Figure 1 comprises a pair of hub sections 2 and 4 which are brazed together at the joints 6 and 8. The sections provide discs, the peripheries of which are joined to a cylindrical strut indicated at 10 forming, in major part, a portion of the hub section 4. Joined to the peripheries of these discs at the end of the strut 10 are the ends of a peripheral shell section of the hub indicated at 12. This hub construction will be recognized as of the type discussed in detail in my application mentioned above, the construction being such that the shell portion is substantially solely in tension during rotation when supporting the blades and cooling fin assemblies which will be shortly referred to. The cylindrical strut 10 is then under compression and prevents the movement toward each other of the discs. Held in engagement with the hub section 2 by a nut 16 threaded on an axial projection from the hub section is a hub element 14 in a bore in which there is secured the end of a tubular shaft 18 which is provided with splines 20 for the driving of the air compressor associated with the turbine. Secured to the hub section 4 by means of the nut 24 threaded on an extension of this hub section is the hub 22 for the second stage of the turbine. The hub 22 is provided with a shaft extension 26 which has suitable mounting in a right-hand bearing. As will be evident, the nuts 16 and 24 hold the complete hub assembly in a unitary rigid structure. Keys such as 27 prevent relative rotation of the parts which are not brazed together.

A cooling air impeller is provided by vane elements 28 and 30 secured respectively to the hub element 14 and the hub section 2. These rotate with suitable clearance within a housing indicated at 32 provided by a portion of the fixed casing.

The first stage blading comprises three rows of blades indicated in Figure 1 respectively at 34, 36 and 38. Between these and the first stage hub there is located the heat exchanger indicated generally at 40 which receives compressed air from the impeller vanes 28 and 30. Between the first and second stages there is a stationary guide vane ring indicated generally at 42.

The rotating blading of the second stage of the turbine is shown at 44 and 46, where 44 serves for the gases and 46 for the cooling air. Surrounding the two stages there is the inner casing having the sections 48 and 50.

Figure 4:
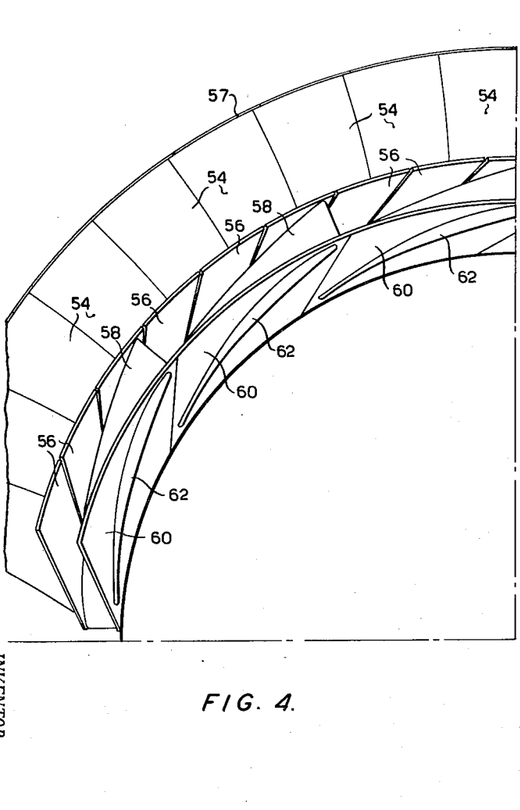
Figure 4 is a fragmentary elevation viewing from the left the stationary guide vane ring illustrated in Figure 1.
Figure 5:
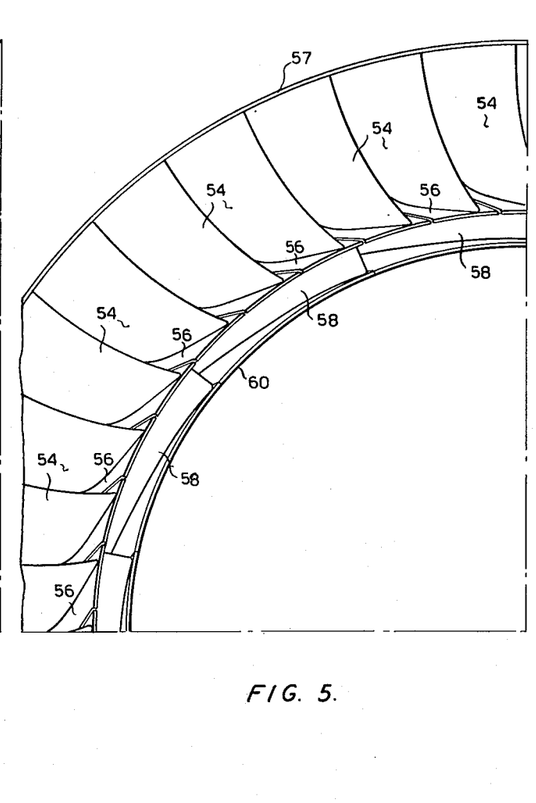
Figure 5 is a fragmentary elevation viewing the same ring from the right.

As will be evident from Figures 1, 4 and 5 the guide vane ring comprises guide vanes 54 which receive gases from the first stage and direct them to the second stage, the vanes being carried by shroud elements 56 and 57, the latter being secured to the exhaust section 50 of the turbine housing. Between the shroud sections 56 and another set of shroud sections 60 there are located the nozzle blades 58 which are hollow as indicated at 62, these nozzle blades serving to direct the cooling air leaving the rotating heat exchanger 40 into the air passages of the second stage blading. As will be clear particularly from consideration of Figures 4 and 5, the guide vane assembly is built up in sections secured together by brazing and welding.

Figure 6:
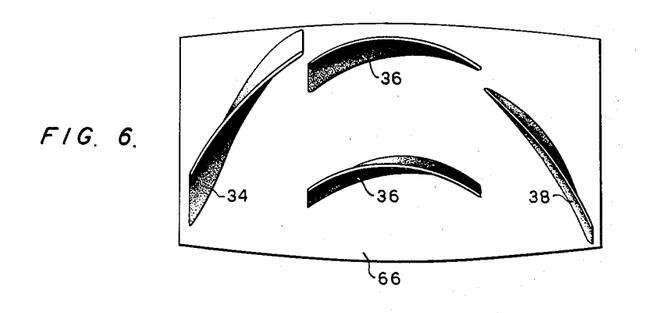
Figure 6 is a plan view of one of the blade and fin segments which are assembled to provide the first stage turbine illustrated in Figure 1.
Figure 7:
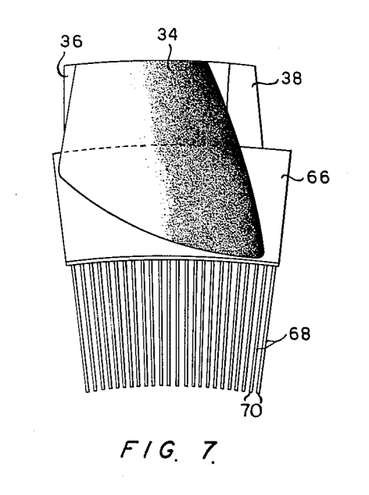
Figure 7 is an elevation viewing the segment of Figure 6 from the left thereof, i. e., looking in the direction of gas and air flow.
Figure 8:
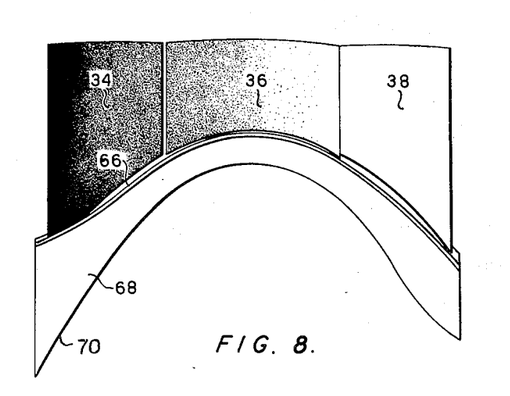
Figure 8 is an elevation of the segment of Figure 6 viewed in a peripheral direction.
Figures 9, 11:
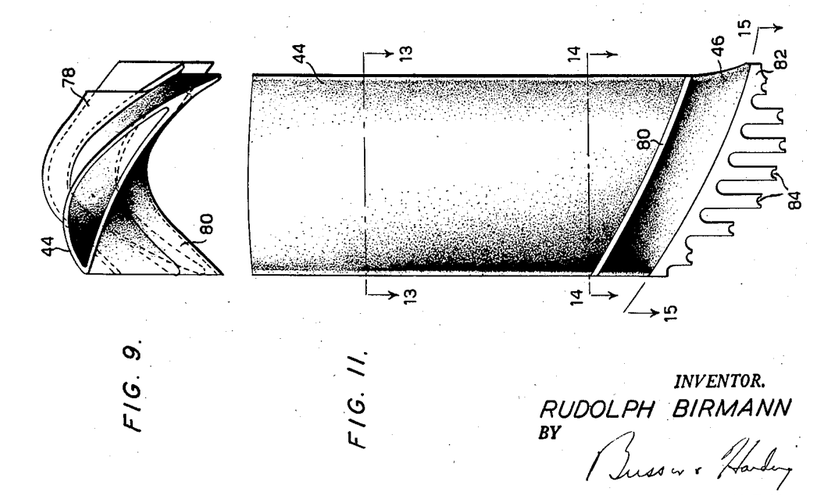
Figure 9 is a plan view in a generally radial direction of a blade of the second stage of the turbine illustrated in Figure 1.
Figure 11 is an elevation of the blade of Figure 9 viewed from the bottom of that figure in the peripheral direction of rotation.
Figures 10, 12, 15:
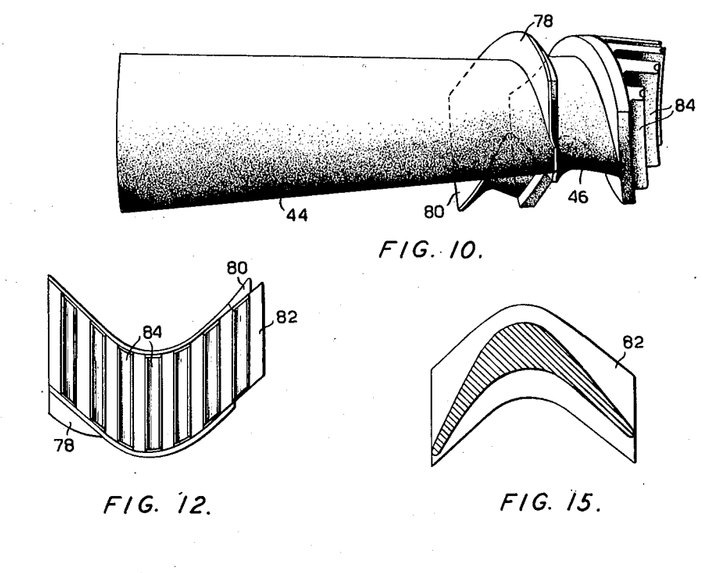
Figure 10 is an elevation of the blade of Figure 9 viewed from the right thereof.
Figure 12 is a bottom plan view of the blade of Figure 9.
Figure 15 is a section taken on the surface indicated at 15—15 in Figure 11 looking in the direction of the arrows.
Figure 13:
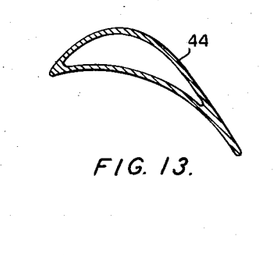
Figure 13 is a section taken on the plane indicated at 13—13 in Figure 11.
Figure 14:
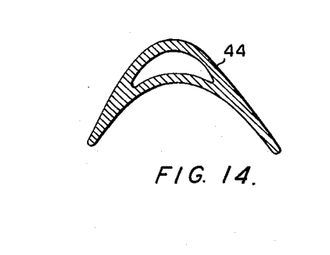
Figure 14 is a section taken on the plane indicated at 14—14 in Figure 11.
Figure 16:
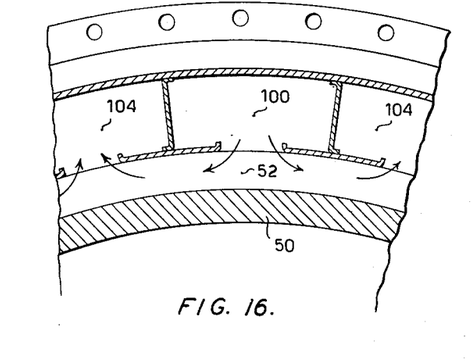
Figure 16 is a fragmentary section taken on the plane indicated at 16—16 in Figure 1.
Figure 17:
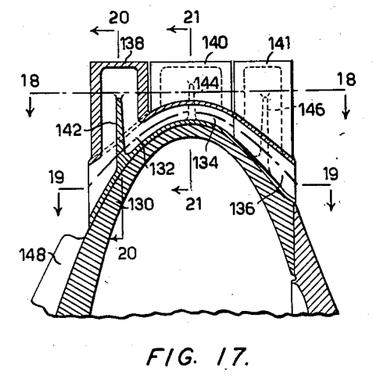
Figure 17 is a section taken on the surface the trace of which is indicated at 17—17 in Figure 18 illustrating an alternative type of blading involving internal air flow cooling.
Figure 18:
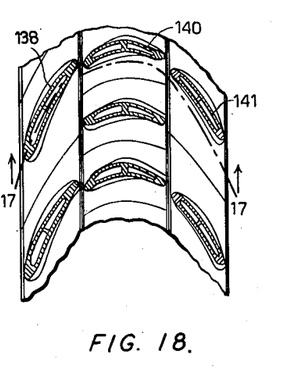
Figure 18 is a development of a section taken on the cylindrical surface indicated at 18—18 in Figure 17.
Figure 19:
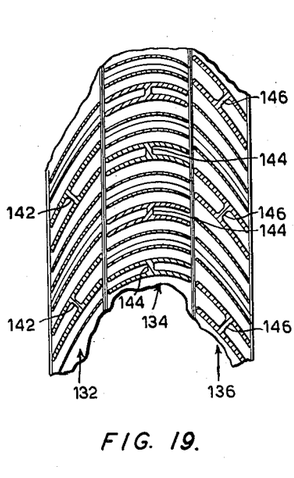
Figure 19 is a development of a section taken on the surface of revolution indicated at 19—19 in Figure 17.
Figure 20:
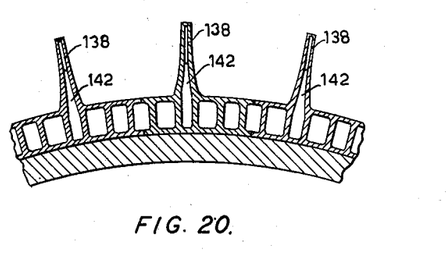
Figure 20 is a section taken on the plane indicated at 20—20 in Figure 17.
Figure 21:
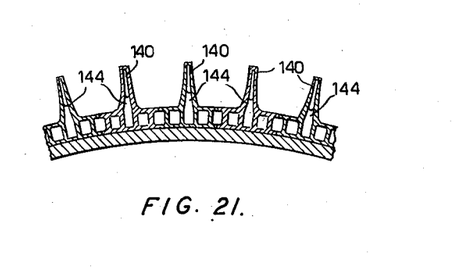
Figure 21 is a section taken on the plane indicated at 21—21 in Figure 17.

The heat exchanger which has been generally referred to as 40 is more fully illustrated in Figures 6, 7 and 8, wherein it will be noted that it comprises fins 68 brazed to the supporting surface 66. Their bases 70 are brazed to the rotor shell, though other modes of assembly may be used. In this modification the fins 68 extend in axial planes so that the relative movement of the cooling air and the first stage hub has no peripheral component, the air flowing first radially outwardly over the outermost portion of the shell and then inwardly to the passages between the nozzle vanes 58. It may be here noted that the fins 68 and the hub may be made of a ferritic alloy of good heat conducting characteristics with the result that cooling is effected to a very high degree by the action of the compressed air flowing between the fins. In contrast, the gas handling blades must generally be made of austenitic material of inferior heat conducting properties. It may also be noted that the fins provided as indicated may be constucted to give a total heat exchange surface with the cooling air of the order of five times the surface area of the blades which are exposed to the driving gases.

The form of a blade 34 of the first row will be clear from consideration of Figures 6, 7 and 8. It will be noted that each of these blades has a skew shape which will be more fully discussed hereafter. Blades 34 as well as blades 36 and 38 may be cast with the supporting surface 66 or may be separately formed and attached thereto by welding or otherwise. Each blade 34 has a generally airfoil shape with rounded inlet and trailing edges and is tapered in a radial direction so as to be substantially thicker at its base than at its tip. This taper provides not only adequate rigidity to prevent deflection of the blade at high speeds of operation but also provides for more effective heat conduction to the surface 66 to increase the effectiveness of cooling of the blade.

Figures 6 to 8, inclusive, similarly illustrate the form of the blades 36 of the second row. As will be evident from these figures these blades also have a skew shape, are tapered so that their base portions are considerably thicker than their tip portions and have airfoil characteristics with rounded leading and trailing edges. As will be evident, this second row of blades effects deviation of the relative velocity of the gases from a forward to rearward direction with respect to the direction of rotation. In order to provide adequate guidance of the gases and achieve the necessary low order of local lift coefficients, there are twice as many of these second row blades as there are blades in the first and third rows. Since these blades are located at the outermost periphery of the hub and since the surrounding casing is cylindrical they have substantially less maximum height than the blades of the first and third rows.

Figures 6 to 8, inclusive, illustrate in similar fashion the shapes of the blades 38 of the third row. These blades serve to complete the deflection of gases in the first stage and are also of skew shape, outwardly tapered section and airfoil character having rounded inlet and outlet edges.

The composite gas and air blades of the second stage are illustrated in Figures 9 to 15, inclusive. As shown therein the gas handling blades 44 are hollow and of a skew nature to provide proper control of the flow as will be evident hereafter. The air guiding blades 46 form, generally speaking, continuations of the blades 44 from the standpoint of their contours. Flanges 78 and 80 serve to separate the gas passages from the air passages between the respective blades. The base of the blade unit is illustrated at 82 and is provided with inwardly extending tongues 84 which are received in corresponding peripheral grooves in the hub 22, the tongues being secured in these grooves by copper, silver, or similar brazing.

Figure 1 shows in section the assembly of the turbine so far described with other elements of a gas turbine power plant. There is shown at 86 the last stage of a multistage air compressor which is driven by the turbine to furnish air for combustion. This compressor may desirably be of the type described in detail in my application Serial Number 428,627 referred to above. Through the compressor shafting the turbine may drive a propeller through suitable reduction gearing; or, alternatively, if the turbine is designed primarily to produce gases for jet propulsion it will deliver such gases at high velocity from its exhaust.

The coupling between the turbine and the compressor is illustrated generally at 88 and since it forms no part of the invention need not be described in detail. The right-hand bearing of the compressor, which constitutes also the left-hand bearing of the turbine, is illustrated generally at 90 while the right-hand bearing for the turbine is illustrated generally at 94. The coupling between the compressor and turbine is of a type which is rigid radially and axially but flexible for angular deflections.

The final stage of the compressor delivers its air through a diffuser 96 to an annular air chamber 98 from which the major portion of the air flows into headers 100 partially surrounding a series of annular fins 102 and 52 carried by the turbine casing elements 48 and 50, previously described. Fins 102 may be made, for example, of copper or silver, inserted in grooves of casing element 48, whereas fins 52 are an integral part of the steel turbine casing element 50. The headers 100 communicate with the spaces between the fins and deliver air to them to be carried annularly between them, confined by an outer shroud which is not illustrated, to receiving headers 104 which also partially surround these vanes. During the flow of air between the vanes intensive heat exchange is effected serving to cool the turbine casing to a safe temperature while, at the same time, the compressed air is heated. The heated air from the headers 104 passes into an annular chamber 106 in which are located the combustion chambers 108 fed with fuel through the nozzles indicated at 110. The air enters the left-hand ends of the combustion chambers to support combustion of the fuel to provide the driving gases for the turbine which are directed to the first row of blades 34 by the nozzles 112.

To effect cooling of the nozzle walls and to protect the external and internal parts from the intense temperature of these walls a chamber 114 in the region of the air passage 98 receives some of the air from that passage and delivers it to jackets 116, one of which surrounds each of the nozzles, the air being delivered in turn from these passages 116 to the annular chamber 106. Here also the air approaching the combustion chamber is heated, the entire construction being such that little of the heat supplied by the fuel is lost though the parts are well protected against too high a temperature.

Communicating chambers 118 and 120 serve to isolate the compressor provided by the blading 28 and 30 from the high temperature regions.

In the operation of the turbine plant so far described air for combustion is compressed in the compressor, the last stage of which is indicated at 86. Desirably, though not necessarily, this compressor is of the type described in detail in my application referred to above. The air from the diffuser 96 passes through the annular passage 98 and into the header 100 from which it flows as previously described. From the receiving header 104 it flows to the combustion chambers 108 wherein fuel in the form of oil or gasoline or powdered solid fuel is burnt.

Expansion takes place in the nozzles 112 which are desirably formed in accordance with the principles set forth in my application referred to above to provide jets of gas having vortex flow characteristics so as to be receivable without impact losses at the entrance edges of the first row of blades 34. The arrangement is such that jets of extremely high velocity are produced with the attendant result that the maximum content of heat energy of the gases is transformed into kinetic energy with resulting maximum drop in stream temperature. The total temperature of absolute velocity (stream temperature plus dynamic increment of the absolute velocity) at the outlet of the nozzles is practically the same as that at the entrance to the nozzles. While cooling is provided for the purpose of holding the temperature of the nozzle walls within permissible limits, this cooling does not reduce the total temperature of the gas stream except to a negligible extent. The stream temperature is greatly reduced, however, by reason of expansion through the nozzles. For blade temperatures only the total temperature of relative flow counts. With very high blade speeds it is possible to achieve low velocities relative to the blades in spite of high absolute velocity at their entrance, which means that the total temperature of the relative flow (stream temperature plus dynamic increment of the relative velocity) is considerably below the total temperature of the absolute flow. The high spouting velocity is, in part, due to the fact that at the nozzle exits the pressures may, at least in part, be less than the pressures existing at the exit from the first turbine stage due to the fact, as will be immediately pointed out, that in the first stage, in the region adjacent to the hub, compression of the gases actually occurs. At any rate, due to the construction of the first stage rotor extremely high velocities of gases may exist consistent with proper low loss transformation of the kinetic energy to shaft output.

The turbine blading is provided in accordance with the principles set forth in my application referred to above. As pointed out therein, designed of elastic fluid passages may be effected utilizing the procedure therein set forth to secure properly balanced flow with proper loading of guiding surfaces to secure a maximum efficiency of conversion of energy of an elastic fluid into mechanical energy or the reverse, the first in the case of a turbine and the second in the case of a compressor. Desirably, an approximation to vortex flow through the passages is maintained though, as pointed out in said application, other conditions of flow may be secured with substantially equivalent results from the standpoint of avoidance of losses. As pointed out in said application the attainment of these ends would generally involve, in the case of single blades extending from inlet to outlet, such departures from radial conditions of the blades that they could not stand up under the conditions of high speed and high temperatures. Accordingly, in accordance with the principles set forth in said application the blades are split up into several rows, in the present case three rows, with the result that the blades of each row have, at least in some portion thereof, substantially radial elements with relatively minor departures from radial condition elsewhere. The result is that the blades are very strong and highly resistant to failure under conditions of high speed and high temperature operation.

However, in the present case, aerodynamic advantages result as well from the division of the blading into a plurality of rows. By forming the sections of individual blades along the lines of flow as airfoils suitable for the relative velocities involved, there is achieved a very considerable increase in efficiency due to the fact that in each row of blades before boundary layers can be built up to a thickness which would involve substantial losses the boundary layers are shed from the trailing edge of each blade and do not carry on to the next blade at which independent boundary layers tend to form and are, in turn, shed before being built up to conditions giving rise to substantial losses. In brief, the blades are short in the direction of relative flow considering the very large total deflection of the relative flow which is of the order of more than 120° in the present design. This large deflection is required to cause the blading to effect the transformation of the extremely high velocity issuing from the nozzles into mechanical energy.

It may also be noted that the arrangement of the blades relative to each other gives rise to boundary layer energization in accordance with the slotted wing principles utilized in aircraft, i. e., energizing of the boundary layers is, in effect, produced which increases the efficiency of the transformation of kinetic to mechanical shaft energy.

With design of the blades in accordance with the principles of the application mentioned above and with the blades arranged as shown and described conditions along different stream lines of the flow vary: adjacent to the hub compression of the gases takes place from inlet to outlet of the blading; along a mean line the inlet and outlet pressures are approximately equal; at the periphery of the blading a reaction condition takes place with some expansion of the gases from a higher pressure at the inlet to a lower pressure at the outlet. The pressure, however, at the outlet edges of the third row of blades is uniform with the result that at the radially inward portions of the nozzles what might be called superexpansion occurs in that the pressure drop through the nozzles at these regions occurs to a pressure less than the discharge pressure from the first stage which means that the gases flowing along the roots of the blades have a somewhat lower total temperature of the relative flow than the gases flowing further outward, this condition offering some protection to the region of junction of the blades to the hub where the stresses are a maximum.

In this connection it may be pointed out that, still in accordance with the principles of the application mentioned above, the blades could be arranged so that a reaction, i. e., a pressure drop, would prevail for all streamlines. In this case there would, in the case of a quite high degree of reaction, be no particular advantage in the multiple blading cascade arrangement because reaction means accelerated flow and therefore a very small, or no, growth of boundary layers may occur, so that even up to fairly high turning angles a single blade could be used.

The situation is different, however, in the case of completely negative reaction for all streamlines where a pressure rise occurs in the blading, this also being obtainable in accordance with the principles mentioned. In this case an adverse pressure gradient would exist in the sense of giving rise to bad boundary layer conditions. This situation may, however, be handled effectively by the subdivided turning by rows of blades in cascade and this end is one of the objectives of the invention. Negative reaction, when the troublesome boundary layer conditions are overcome, has very distinct merits in that low blade temperatures are obtainable as the result of superexpansion in the nozzles and also in that high turbine efficiencies become possible with relatively low ratios of the peripheral component of the absolute velocity to the absolute velocity.

The gas-directing vanes between the first and second stages are also designed in accordance with the principles set forth in said application to maintain vortex flow for entrance to the blading of the second stage. The second stage blading is also designed in accordance with the principles of said application to maintain approximately vortex flow therethrough. As will be evident, this adherence to the principles of that application gives rise to a maximum efficiency of operation of the entire turbine unit.

Cooling is also effected in such fashion as to be most effective and yet entail a minimum of losses. The arrangement of the rows of blades to form cascades produces an open structure of low solidity so that highly effective radiation of heat from the blades occurs both to the outer wall of the turbine casing and to the hub surface at the roots of the blades. The heat which is transferred to the outer boundary wall is very effectively removed by the flow of the compressed air between the fins 102. At the same time this heat is not lost since it is added to the compressed air approaching the combustion chambers. It may be noted that due to the high spouting velocity the blades are of relatively low height so as to bring all portions of the blades close to those cooler walls to which radiation should and does occur.

The hub surface by which the blades are carried is the outer surface of the heat exchange structure heretofore described which offers to the cooling air a surface of the order of five times the surface area of the vanes. To this heat exchanger heat is transmitted by both radiation and conduction from the blades and to some extent by convection from the flowing gases. The cooling air compressor, provided in the form of an impeller constituting part of the hub, produces at the entrance to the rotating heat exchanger a pressure which may be of the order of two atmospheres. The air passing through the heat exchanger is heated and in the stationary nozzles between the stages is expanded to provide a high velocity of flow of the air acting on the air blades of the second stage. The energy imparted to the cooling air by the impeller and by the heat which is transferred thereto is thus utilized to provide a driving torque to the second stage rotor with the result that though highly effective cooling is effected this does not represent a loss; in fact, under rated conditions of operation there may be some slight net transformation of energy effected in the cooling system from the heat energy introduced by the fuel to mechanical energy of the shaft.

In view of the cooling which is effected, what amounts to a very strong mounting of the blades to the rotor is achieved without the disadvantage of the substantial weight of fastening devices which are commonly involved. Brazing may, in this case, be used to secure the heat exchanger to the shell with low safe stresses in the brazed joint. The airfoil blades form an integral part of the heat exchanger sections and altogether an extremely light but strong structure is attained.

The securing of the low pressure stage blading to the rotor by brazing is also made possible by reason of the cooling passages which protect the brazing from the high temperature of the gas flow.

The rotor of the first stage is of the type described in my prior application mentioned above and need not be fully described herein. It will suffice to point out that the rotor comprises radial discs in association with a cylindrical strut to provide a rigid central portion with the disc and strut ends connected by a body of revolution which has a shape such that all portions thereof are substantially only in tension under the load imposed by the mass of the hub itself, the heat exchanger and blading. Distortion in operation is thus avoided and utilization is made of the high strength of the hub metal in tension. The hollow structure is, nevertheless, very light in weight so as to be suitable for extremely high speed operation.

Even more intensive cooling of the first stage turbine blades may be attained by the use of the structure which is illustrated in Figures 17 to 21, inclusive. The hub 130 in this case supports a heat exchanger through the medium of brazed joints, which exchanger comprises sections 132, 134 and 136 corresponding to the three rows of blades 138, 140 and 141 which externally have the same shapes as the blades previously described. The heat exchanger channels in this case, however, are provided by fins which follow the contours of the roots of the vanes as will be particularly evident from Figure 18. Between pairs of vanes which directly underlie the surfaces of the blades there are provided upwardly extending baffles such as 142 in the first row, 144 in the second row and 146 in the third row. These baffles extend upwardly into the hollows in the blades forcing the air received from the impeller 148 upwardly into the blades, the air then flowing downwardly into the remaining portion of a corresponding channel provided by the cooling vanes. As will be noted from Figure 19 the arrangement may be made such that the air flowing through any particular channel will pass into only a single blade with the result that effective cooling of the blades in all of the rows is attained. It may also be noted that the air in this case is discharged not axially but in a rearward direction relatively to the first stage rotor so that by reaction mechanical energy recovery from the heated and high velocity air is secured. It will, of course, be understood that the stationary passages for the air between the two stages will be properly formed to receive and redirect the air to the air passages of the second stage. These stationary passages will then effect the final transformation of the energy of the air into velocity which will aid in driving the second stage rotor.

It will be evident that numerous variations may be made in the embodiments of the foregoing principles without departing therefrom and accordingly the invention is not to be understood as limited except as required by the following claims.

What I claim and desire to protect by Letters Patent is:

1. A turbine rotor comprising a hub having an interior portion and blades carried by the hub, the hub including adjacent to its periphery and inwardly of the innermost portions of the blades cooling air passages defined by a vane structure brazed to said interior portion of the hub, the total surface area of said passages exposed to cooling air substantially exceeding the total area of said blades.

2. A turbine rotor comprising a hub having an interior portion and blades carried by the hub, the hub including adjacent to its periphery and inwardly of the innermost portions of the blades cooling air passages defined by a vane structure brazed to said interior portion of the hub, the blades being welded to said vane structure, the total surface area of said passages exposed to cooling air substantially exceeding the total area of said blades.

3. A multiple stage gas turbine comprising a pair of rotors, the first of said rotors including a hub and blades carried thereby, the hub being provided at its periphery inside the roots of the blades with cooling air passages, the second of said rotors including blading providing gas passages and cooling air passages inwardly of said gas passages, stationary vanes directing gas from the gas passages of the first rotor to the gas passages of the second rotor, and stationary vanes directing air from the cooling air passages of the first rotor to the cooling air passages of the second rotor, the last mentioned vanes defining nozzles to provide jets of the cooling air to drive the second rotor, and the cooling air passages of the second rotor being formed as turbine passages to receive said jets for driving of the second rotor.

4. A multiple stage gas turbine comprising a pair of rotors, the first of said rotors including a hub and blades carried thereby, the hub being provided at its periphery inside the roots of the blades with cooling air passages, the second of said rotors including blading providing gas passages and cooling air passages inwardly of said gas passages, impeller vanes carried by the first rotor to supply compressed air to the cooling air passages of the first rotor, stationary vanes directing gas from the gas passages of the first rotor to the gas passages of the second rotor, and stationary vanes directing air from the cooling air passages of the first rotor to the cooling air passages of the second rotor, the last mentioned vanes defining nozzles to provide jets of the cooling air to drive the second rotor, and the cooling air passages of the second rotor being formed as turbine passages to receive said jets for driving of the second rotor.

5. A turbine comprising a housing, a rotor within said housing comprising a hub and blades carried by the hub, said hub, blades and housing bounding elastic fluid passages, and means arranged to direct elastic fluid to said passages to drive the rotor, the surface of the hub interiorly bounding said elastic fluid passages and being a surface of revolution of which meridian lines are outwardly convex with maximum radius intermediate the inlet and outlet of said passages, the axial length of said passages interiorly bounded by said surface of revolution being substantially greater than the maximum radial dimension of said passages.

6. A turbine comprising a housing, a rotor within said housing comprising a hub and blades carried by the hub, said hub, blades and housing bounding elastic fluid passages, and means arranged to direct elastic fluid to said passages to drive the rotor, the surface of the hub interiorly bounding said elastic fluid passages and being a surface of revolution of which meridian lines are outwardly convex and of increasing radius from the inlet at least part way to the outlet of said elastic fluid passages, and said blades being shaped to constitute means to maintain approximately vortex flow from the inlet to the outlet of said elastic fluid passages.

7. A turbine comprising a housing, a rotor within said housing comprising a hub and a plurality of sets of blades carried by the hub, said hub, blades and housing bounding elastic fluid passages, and means for directing elastic fluid at high velocity to said passages to drive the rotor, said blades being shaped to constitute means to maintain approximately vortex flow through the passages bounded by the blades, the blades of each set subsequent to the first receiving directly and without substantial deflection the flow from the blades of the preceding set.

8. A turbine according to claim 7 in which each of the blades has at least one portion which is substantially radial.

9. A turbine comprising a housing, a rotor within said housing comprising a hub and a plurality of sets of blades carried by the hub, said hub, blades and housing bounding elastic fluid passages, and means for directing elastic fluid at high velocity to said passages to drive the rotor, said blades being shaped and arranged to provide successive deflections of the elastic fluid flow from a condition at the inlet of said fluid passages in which the peripheral components of the relative velocity of the flow are in the direction of rotation of the blades to a condition at the outlet of the fluid passages in which the peripheral components of the relative velocity of the flow are opposite the direction of rotation of the blades, the blades at said inlet of the fluid passages extending, in the direction of flow, forwardly with respect to the direction of their rotation, and the blades at said outlet of the fluid passages extending, in the direction of flow, rearwardly with respect to the direction of their rotation, the blades of each set subsequent to the first receiving directly and without substantial deflection the flow from the blades of the preceding set, the radial heights of said blades decreasing from said inlet to a minimum intermediate the inlet and outlet and then increasing to said outlet.

10. A turbine according to claim 9 in which blades extend axially at portions of the elastic fluid passages between their inlet and outlet and in which the radial heights of the blades are minimum approximately where the blades extend axially.

11. A turbine according to claim 9 in which the blades are of airfoil type.

12. A turbine according to claim 9 in which the sets of blades are arranged in axially displaced rows.

13. A turbine according to claim 12 in which there are at least three axially displaced rows of blades and in which there is a greater number of blades in an intermediate row than in the entrance and discharge rows.

14. A turbine according to claim 9 in which the flow occurs along streamlines through the blades and in which the blades are shaped to provide compression along at least some of the streamlines of flow therethrough.

15. A turbine according to claim 9 in which the surface of the hub interiorly bounding said elastic fluid passages is a surface of revolution of which meridian lines are outwardly convex.

16. A turbine rotor comprising a hub and blades carried thereby, the hub including adjacent to its periphery and inwardly of the innermost portions of the blades an annular cooling air zone containing vanes, said innermost portions of the blades extending in a skew direction relative to the axis of the hub and said vanes extending in the same skew direction as said innermost portions of the blades to provide cooling air passages, the blades being provided with passages to receive cooling air from said cooling air passages and to return the air to said cooling air passages.

17. A turbine comprising a housing, a rotor within said housing comprising a hub and blades carried by the hub, said hub, blades and housing bounding elastic fluid passages, and means for directing elastic fluid to said passages to drive the rotor, the surface of the hub interiorly bounding said elastic fluid passages and being a surface of revolution of which meridian lines are outwardly convex with maximum radius intermediate the inlet and outlet of said passages, the axial length of said passages interiorly bounded by said surface of revolution being substantially greater than the maximum radial dimension of said passages, and the hub including adjacent to its periphery and inwardly of the blade roots cooling air passages defined by vanes.

18. A turbine comprising a housing, a rotor within said housing comprising a hub and blades carried by the hub, said hub, blades and housing bounding elastic fluid passages, and means for directing elastic fluid to said passages to drive the rotor, the surface of the hub interiorly bounding said elastic fluid passages and being a surface of revolution of which meridian lines are outwardly convex with maximum radius intermediate the inlet and outlet of said passages, the axial length of said passages interiorly bounded by said surface of revolution being substantially greater than the maximum radial dimension of said passages, and the hub including adjacent to its periphery and inwardly of the blade roots cooling air passages defined by a vane structure brazed to the interior portion of the hub.

19. A turbine comprising a housing, a rotor within said housing comprising a hub and blades carried by the hub, said hub, blades and housing bounding elastic fluid passages, and means arranged to direct elastic fluid to said passages to drive the rotor, the surface of the hub interiorly bounding said elastic fluid passages and being a surface of revolution of which meridian lines are outwardly convex with maximum radius intermediate the inlet and outlet of said passages, the axial length of said passages interiorly bounded by said surface of revolution being substantially greater than the maximum radial dimension of said passages, and said hub being hollow and shaped so that its walls are substantially only under tension under the action of centrifugal forces.

20. A turbine comprising a housing, a rotor within said housing comprising a hub and blades carried by the hub, said hub, blades and housing bounding elastic fluid passages, and means for directing elastic fluid to said passages to drive the rotor, the surface of the hub interiorly bounding said elastic fluid pasages and being a surface of revolution of which meridian lines are outwardly convex with maximum radius intermediate the inlet and outlet of said passages, the axial length of said passages interiorly bounded by said surface of revolution being substantially greater than the maximum radial dimension of said passages, said hub being hollow and shaped so that its walls are substantially only under tension under the action of centrifugal forces, and compressor vanes carried by said hub, the air passages defined by the compressor vanes being inwardly delimited by the surface of the hub and outwardly bounded by the housing.

21. A turbine comprising a housing, a rotor within said housing comprising a hub and deflection blades carried by the hub, said hub, blades and housing bounding elastic fluid passages, and means for directing elastic fluid at high velocity to said passages to drive the rotor, said blades being shaped and arranged to provide deflection of the elastic fluid flow from a condition at the inlet of said fluid passages in which the peripheral components of the relative velocity of the flow are in the direction of rotation of the blades to a condition at the output of the fluid passages in which the peripheral components of the relative velocity of the flow are opposite the direction of rotation of the blades, the blades at said inlet of the fluid passages extending, in the direction of flow, forwardly with respect to the direction of their rotation, and the blades at said outlet of the fluid passages extending, in the direction of flow, rearwardly with respect to the direction of their rotation, the radial heights of said blades decreasing from said inlet to a minimum intermediate the inlet and outlet and then increasing to said outlet.

22. A turbine according to claim 21 in which the radial heights of the blades are minimum approximately where the relative velocity of the flow has a zero peripheral component due to approximately axial extent of the blades.

23. A turbine according to claim 21 in which the surface of the hub interiorly bounding said elastic fluid passages is a surface of revolution of which meridian lines are outwardly convex.

References Cited in the file of this patent

UNITED STATES PATENTS

| | | |
|---|---|---|
| 822,801 | Wilkinson | June 5, 1906 |
| 1,447,554 | Jones | Mar. 6, 1923 |
| 1,470,499 | Steenstrup | Oct. 9, 1923 |
| 1,601,614 | Fleming | Sept. 28, 1926 |
| 1,998,393 | Junggren | Apr. 16, 1935 |
| 2,244,467 | Lysholm | June 3, 1941 |
| 2,313,413 | Weske | Mar. 9, 1943 |
| 2,326,072 | Seippel | Aug. 3, 1943 |
| 2,356,605 | Meininghaus | Aug. 22, 1944 |
| 2,364,189 | Buchi | Dec. 5, 1944 |
| 2,378,372 | Whittle | June 12, 1945 |
| 2,382,564 | Haverstick | Aug. 14, 1945 |
| 2,390,506 | Buchi | Dec. 11, 1945 |
| 2,406,126 | Zweifel | Aug. 20, 1946 |
| 2,407,531 | Birmann | Sept. 10, 1946 |
| 2,414,278 | Soderberg | Jan. 14, 1947 |
| 2,428,830 | Birmann | Oct. 14, 1947 |
| 2,446,552 | Redding | Aug. 10, 1948 |
| 2,447,696 | Forsyth | Aug. 24, 1948 |
| 2,468,461 | Price | Apr. 26, 1949 |
| 2,487,514 | Boestad | Nov. 8, 1949 |
| 2,603,453 | Sollinger | July 15, 1952 |
| 2,618,120 | Papini | Nov. 18, 1952 |
| 2,620,624 | Wislicenus | Dec. 9, 1952 |

FOREIGN PATENTS

| | | |
|---|---|---|
| 372,280 | Italy | Jan. 22, 1939 |
| 290,960 | Great Britain | Oct. 1, 1928 |
| 505,078 | Great Britain | May 2, 1939 |
| 578,191 | Great Britain | June 19, 1946 |